(12) United States Patent
Blake et al.

(10) Patent No.: US 10,367,796 B2
(45) Date of Patent: Jul. 30, 2019

(54) METHODS AND APPARATUS FOR RECORDING A CHANGE OF AUTHORIZATION STATE OF ONE OR MORE AUTHORIZATION AGENTS

(71) Applicant: Cygnetise Limited, London (GB)

(72) Inventors: Shaun Keith Blake, Buckinghamshire (GB); Stephen John Pomfret, London (GB)

(73) Assignee: Cygnetise Limited, London (GB)

( * ) Notice: Subject to any disclaimer, the term of this patent is extended or adjusted under 35 U.S.C. 154(b) by 157 days.

(21) Appl. No.: 15/399,640

(22) Filed: Jan. 5, 2017

(65) Prior Publication Data

US 2018/0115538 A1    Apr. 26, 2018

(30) Foreign Application Priority Data

Oct. 21, 2016    (GB) .................................. 1617872.5

(51) Int. Cl.
| | |
|---|---|
| *H04L 29/06* | (2006.01) |
| *H04L 9/06* | (2006.01) |
| *H04L 9/14* | (2006.01) |
| *H04L 9/30* | (2006.01) |
| *H04L 9/32* | (2006.01) |
| *G06Q 20/40* | (2012.01) |

(52) U.S. Cl.
CPC .......... *H04L 63/065* (2013.01); *H04L 9/0637* (2013.01); *H04L 9/0643* (2013.01); *H04L 9/14* (2013.01); *H04L 9/30* (2013.01); *H04L 9/3236* (2013.01); *H04L 9/3247* (2013.01); *H04L 9/3297* (2013.01); *H04L 63/10* (2013.01); *G06Q 20/40* (2013.01); *G06Q 20/40975* (2013.01); *H04L 63/0823* (2013.01); *H04L 63/123* (2013.01); *H04L 2209/56* (2013.01)

(58) Field of Classification Search
CPC ....... H04L 63/06; H04L 63/065; H04L 63/10; H04L 63/08; H04L 9/0637; H04L 9/0643; H04L 9/14; H04L 9/30; H04L 9/3247; H04L 9/06; H04L 9/32; G06Q 20/40; G06Q 20/40973; G06Q 20/405; G06Q 20/401
See application file for complete search history.

(56) References Cited

U.S. PATENT DOCUMENTS

| | | | |
|---|---|---|---|
| 2017/0366357 A1* | 12/2017 | Pattanaik | .............. H04L 63/062 |
| 2018/0089641 A1* | 3/2018 | Chan | .................. G06Q 20/0655 |

* cited by examiner

*Primary Examiner* — Khalil Naghdali
*Assistant Examiner* — Shaqueal D Wade
(74) *Attorney, Agent, or Firm* — Haynes Beffel & Wolfeld LLP; Ernest J. Beffel, Jr.; Andrew L. Dunlap

(57) ABSTRACT

Roughly described, a method of recording a change of authorization state of one or more authorization agents, the method comprising: establishing a copy of a blockchain ledger at each of a plurality of blockchain nodes, wherein each of the blockchain nodes is associated with a different controlling entity; providing a public key/private key pair for a first of the blockchain nodes; receiving, from the communication device, a first message comprising: first data indicative of a change of authorization state of a first authorization agent associated with the first controlling entity, the first data being encrypted; and a digital signature based on the blockchain ledger and the private key; authenticating the message using the public key; adding a block to the blockchain ledger based on the first message, thereby to generate a new blockchain ledger that records the change of authorization state of the first authorization agent.

24 Claims, 5 Drawing Sheets

METHODS AND APPARATUS FOR RECORDING A CHANGE OF AUTHORIZATION STATE OF ONE OR MORE AUTHORIZATION AGENTS

FIELD OF INVENTION

The present invention relates to methods and apparatus for recording a change of authorisation state of one or more authorisation agents.

BACKGROUND

Maintaining a verifiable and accurate record of authorisation states of authorisation agents may be complex, especially where the authorisation states change rapidly and/or frequently. Access to such records may also need to be controlled, particularly where third parties are involved.

SUMMARY OF THE INVENTION

According to the present invention there is provided a method of recording a change of authorisation state of one or more authorisation agents, the method comprising: establishing a copy of a blockchain ledger at each of a plurality of blockchain nodes, wherein each of the blockchain nodes is associated with a different controlling entity; providing a public key/private key pair for a first of the blockchain nodes, the private key being for storage in, or in a manner accessible to, a communication device associated with the first controlling entity; receiving, from the communication device, a first message comprising: first data indicative of a change of authorisation state of a first authorisation agent associated with the first controlling entity, the first data being encrypted; and a digital signature based on the blockchain ledger and the private key; authenticating the message using the public key; adding a block to the blockchain ledger based on the first message, thereby to generate a new blockchain ledger that records the change of authorisation state of the first authorisation agent; and outputting a copy of the new blockchain ledger for distribution to the other blockchain node(s) of the plurality of blockchain nodes.

According to a second aspect of the present invention there is provided a method of enabling recording of a change of authorisation state of an authorisation agent associated with a controlling entity, the method comprising, in a communication device: accepting input regarding a change of authorisation state of a first authorisation agent associated with a controlling entity; generating first data indicative of the change of authorisation state, the first data being encrypted; generating a digital signature based on a blockchain ledger and a private key, the blockchain ledger being hosted on a plurality of blockchain nodes, at least one of which is associated with the controlling entity and accessible to the communication device; and transmitting a first message to the accessible blockchain node, the first message comprising the first data and the digital signature; such that the accessible blockchain node can add a block to the blockchain ledger based on the first message to generate a new blockchain ledger that records the change of authorisation state of the first authorisation agent.

According to a third aspect of the present invention there is provided a first blockchain node, the first blockchain node being one of a plurality of blockchain nodes, each blockchain node storing a copy of a block chain ledger and each blockchain node being associated with a different controlling entity and a public key/private key pair, the blockchain node being configured to record a change of authorisation state of one or more authorisation agents by: receiving, from a communication device, the communication device storing a private key or being capable of accessing it, a first message comprising: first data indicative of a change of authorisation state of a first authorisation agent associated with a first controlling entity, the first data being encrypted; and a digital signature based on the blockchain ledger and the private key; authenticating the message using the public key; adding a block to the blockchain ledger based on the first message, thereby to generate a new blockchain ledger that records the change of authorisation state of the first authorisation agent; and outputting a copy of the new blockchain ledger for distribution to the other blockchain node(s) of the plurality of blockchain nodes.

According to a fourth aspect of the present invention there is provided a communication device for enabling recording of a change of authorisation agent associated with a controlling entity, the communication device being configured to: accept input regarding a change of authorisation state of a first authorisation agent associated with a controlling entity; generate first data indicative of the change of authorisation state, the first data being encrypted; generate a digital signature based on a blockchain ledger and a private key, the blockchain ledger being hosted on a plurality of blockchain nodes, at least one of which is associated with the controlling entity and accessible to the communication device; and transmit a first message to the accessible blockchain node, the first message comprising the first data and the digital signature; such that the accessible blockchain node can add a block to the blockchain ledger based on the first message to generate a new blockchain ledger that records the change of authorisation state of the first authorisation agent.

The digital signature may comprise the output of a hash function applied to the blockchain ledger using the private key.

The digital signature may comprise the output of a hash function applied to a combination of the first data and the blockchain ledger using the private key.

The first data may be encrypted using the private key.

The message may comprise time or indexing data.

The digital signature may comprise the output of a hash function applied to the time or indexing data using the private key.

BRIEF DESCRIPTION OF THE DRAWINGS

Embodiments of the invention will now be described, by way of example only, with reference to the accompanying drawings, in which.

DETAILED DESCRIPTION

Figure 1:
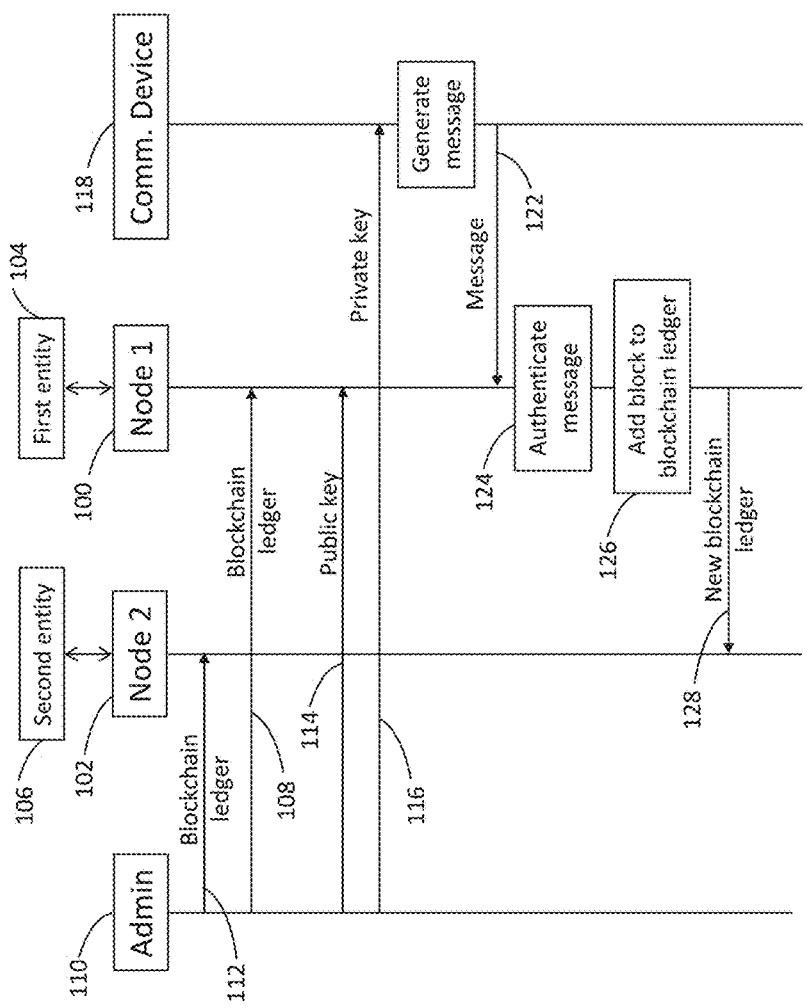
FIG. 1 is a sequence diagram showing the recording of a change of authorisation state of an authorisation agent, according to the invention.

Turning to the drawings, FIG. 1 shows a sequence of steps involved in recording a change of authorisation state of an authorisation agent.

First, a copy of a blockchain ledger is established on each of a plurality of blockchain nodes, in this embodiment represented by a first blockchain node 100 and a second blockchain node 102. The first blockchain node 100 is associated with a first controlling entity 104, and the second blockchain node 102 is associated with a second controlling entity 106. Each of the first and second controlling entities may be, for example, a company or a natural person.

A blockchain ledger is a data structure that is intended to store information sequentially in the form of blocks. Each block may contain, for example, information regarding a change of authorisation state of an authorisation agent, along with a digital signature based on a previous version or state of the blockchain ledger, as described in more detail below. The blockchain ledger may initially be empty (ie, may contain no blocks, and hence no information regarding authorisation states of authorisation agents). The technical operation of blockchain ledgers is well understood and so will not be described in more detail.

A copy of the blockchain ledger may be established on the first blockchain node 100 and the second blockchain node 102 by any suitable means. For example, the blockchain ledger may be shared from a centralised node (which may itself be one of the blockchain nodes) or may be distributed via a mesh or self-propagating network from blockchain node to blockchain node. The embodiment of FIG. 1 shows the blockchain ledger as initially being transmitted 108 from an admin node 110 to the first blockchain node 100, and transmitted 112 from the admin node 110 to the second blockchain node 102.

A public key/private key pair is provided for the first blockchain node 100. The public key/private key pair may be generated in any suitable way, as will be well understood by the skilled person in the field of asymmetric cryptography. The public key is distributed 114 to, and stored by, the first blockchain node 100. The private key is distributed 116 to, and stored by, a first communication device 118. For the sake of simplicity, the public and private keys are shown as being distributed from the admin node 110. There is no requirement that the public and/or private key be distributed from the same network entity or entities that initially distribute(s) the blockchain ledger. In other embodiments, one or more of the public and/or private keys may be installed directly onto the communication device 118 or the first and/or second blockchain nodes 100 and 102 during initial hardware/software commissioning.

The first communication device 118 is associated with the first controlling entity 104, and may be any electronic device that is capable of communicating with the first blockchain node 100. In the embodiment described, the first communication device 118 is a personal computer running software that enables it to communicate with the first blockchain node 100 via the internet, either directly or via an intermediate wired or wireless network and/or protocol.

The first communication device 118 may accept information regarding a change of authorisation state of one or more authorisation agents associated with the first controlling entity 104. The information may be input via one or more interface devices connected to, or forming part of, the first communication device. The interface devices may, for example, comprise a keyboard, a mouse, a display screen, a touchpad, a touchscreen, or any combination thereof. The change of authorisation state may be typed into a field of an interface, selected from a drop-down menu listing available authorisation states, or selected from a list by clicking on a checkbox, for example.

Any number of suitable authorisation states may be possible in a particular embodiment. In a simple form, the presence of an authorisation agent in a list indicates that they/it is authorised. Alternatively, an authorisation state for an authorisation agent may be recorded as "authorised" or "not authorised". In more complex examples, potential authorisation states may include partial or limited authorisation, date-limited authorisation, or co-authorisation.

When it is desired to record a change of authorisation state, a user accesses the communication device 118 via an interface. The user inputs the required authorisation state change (examples of which are set out in more detail below) and then commits the change by clicking on a button or otherwise indicating via the interface that the change is to be committed.

Software running on the communication device 118 generates a message including first data that is indicative of the committed change of authorisation state of the first authorisation agent. The first data is encrypted to prevent undesired access, such as during transmission as part of the message. In the present embodiment, the encryption is at least partly based on the private key. However, this is optional, and the encryption may be based on any suitable symmetric or asymmetric encryption protocol. Examples of encryption schemes include AES/Rijndeal, Blowfish, PGP, and RSA, which are well known to those skilled in the field of cryptography.

The message also includes a digital signature based on the previous blockchain ledger state and the private key. For example, the digital signature may be the output of a hash function applied to the blockchain ledger using the private key. Alternatively, the digital signature may be the output of a hash function applied to the first data and the blockchain ledger using the private key. In yet another alternative, the digital signature may be the output of a hash function applied to the blockchain ledger and other data. Examples of public key/private key encryption schemes used to generate the digital signature include RSA and PKCS #1, which are well known to those skilled in the field of cryptography.

The message optionally includes time and/or indexing data. For example, the time data may be the time at which the data is input and/or committed to a new block. Alternatively, or in addition, the time data may include a time (such as a date) at or from which the change in authorisation state became or becomes effective. The time data may include a data range during which the change in authorisation state is effective. Indexing data may include a sequence identifier or other indicator of order. The digital signature may comprise the output of a hash function applied to the time or indexing data using the private key, either individually or as part of the other information to which the hash function is applied.

Returning to FIG. 1, the message is transmitted 122 by the communication device 118 to the first blockchain node 100. The first blockchain node 100 authenticates 124 the message using the public key and the digital signature. This form of authentication is well understood by the skilled person, and so will not be described in more detail here.

Once the message is authenticated, the first blockchain node 100 adds 126 a new block to the blockchain ledger based on the message. In the present embodiment, the new block includes the digital signature and information indicative of the change of authorisation state of the first authorisation agent. The information may, for example, be the authorisation state that was selected by the user when interacting with the interface on the communication device 118. The information may optionally be stored as an index or key rather than as text describing the state. For example, an index value of 0 may map to "unauthorised" and an index value of 1 may map to "authorised".

The information also identifies the authorisation agent to which the change of authorisation state applies. The information may provide the identification by comprising a hash of the identification information which can be compared to the identification.

The authorisation agent may be identified by, for example, any combination of:
   Unique identifier of the authorisation agent within the blockchain and/or instrument in relation to which the authorisation agent is authorised.
   Employee identifier.
   Nickname or other shorthand reference.
   Full or partial legal name.
   Date of birth.
   Home or business address.
   Email address.
   Phone number.
   Job title.
   Employment role.
   Authorisation agent category.
   Biometric information.
   Specimen signature (The signature may be stored in rasterized or vector-based form. A hash of the signature may be generated and the hash of the signature may be stored).
   Email address.
   Phone number.
   Authorisation agent authority level (where more than one level of authority level exists in relation to a particular instrument).

This list not intended to be exhaustive. It will also be understood that any of these, or other, pieces of information may be stored in a block for the sake of information rather than, or in addition to, being for the purpose of identifying the authorisation agent.

A hash of the one or more pieces of information may be generated and stored on the blockchain. The actual information may be stored separately to the blockchain. The hash can then be compared to the separately stored information.

By adding the block to the blockchain ledger, a new blockchain ledger is generated. The new blockchain ledger records the change of authorisation state of the first authorisation agent.

In the embodiment of FIG. 1, the first blockchain node 100 transmits 128 a copy of the new blockchain ledger to the second blockchain node 102. The second blockchain node 192 uses the digital signature in the new block to confirm that no changes have been made to previous blocks in the blockchain ledger. Once verified, the new blockchain ledger replaces the previous copy of the blockchain ledger in the second blockchain node 102.

In embodiments where there are several other blockchain nodes, the new blockchain ledger may be distributed to the other blockchain nodes by any suitable means. It may be convenient for the blockchain node that added the new block to distribute the new blockchain ledger directly to each of the other blockchain nodes. Alternatively, the blockchain node that added the new block may distribute the new blockchain ledger to a subset of the other blockchain nodes. Each of those blockchain nodes may in turn further distribute the new blockchain ledger, and the process may be repeated until all of the blockchain nodes has a copy of the new blockchain ledger. Each blockchain node verifies the new blockchain ledger using the digital signature, as described above in relation to the second blockchain node 102.

To increase security, distribution of the new blockchain ledger to the other blockchain nodes may itself involve encryption and/or authentication. For example, each blockchain node may hold its own private key that it uses to encrypt and/or digitally sign new blocks and blockchain ledgers. The public key associated with each private key is distributed to all the other blockchain nodes. This allows each blockchain node to decrypt and/or authenticate a new blockchain ledger that it receives from another of the blockchain nodes.

Each of the blockchain nodes may, for example, run on its own server. The server may be a dedicated physical device (such as a personal computer) or a virtual server running on a physical device. Any or all of the blockchain nodes may be hosted at premises controlled by their corresponding respective controlling entities. Alternatively, or in addition, any or all of the blockchain nodes may be hosted remotely, such as in a cloud computing environment. In either case, each blockchain node may be accessed by the associated communication device by way of any suitable combination of LAN network, WLAN network, Bluetooth™, or other wired and/or wireless communications protocol(s). Access may be via a local or remote web server.

Figure 2:
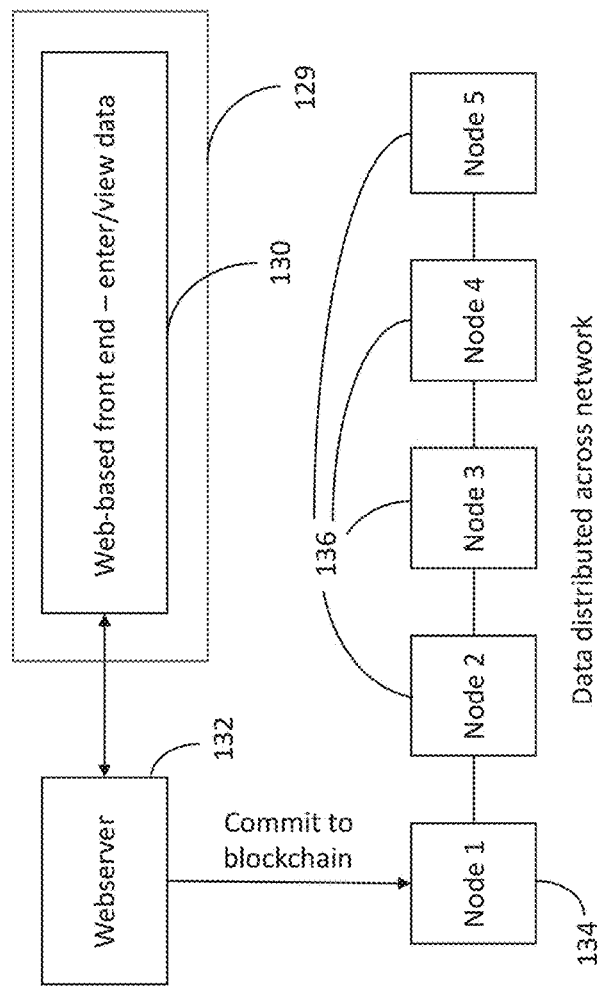
FIG. 2 is a schematic diagram showing data flows associated with an embodiment of the invention.

FIG. 2 shows a simplified view of data flows associated with an embodiment of the invention. A communication device 129 (corresponding with the communication device 118 described above) allows a user to enter and view data associated with the blockchain ledger via a web-based front end 130. A webserver 132 acts as a portal between the web-based front end 130 and a blockchain node 134 (corresponding with the first blockchain node 100 described above). Communication may be via a REST service, for example, as will be understood by the skilled person.

As described above, once a change of authorisation state is committed to the blockchain ledger in the blockchain node 134, the resulting new blockchain ledger is distributed to other blockchain nodes 136 (corresponding with the second blockchain node 102 described above) in the network.

Figure 3:
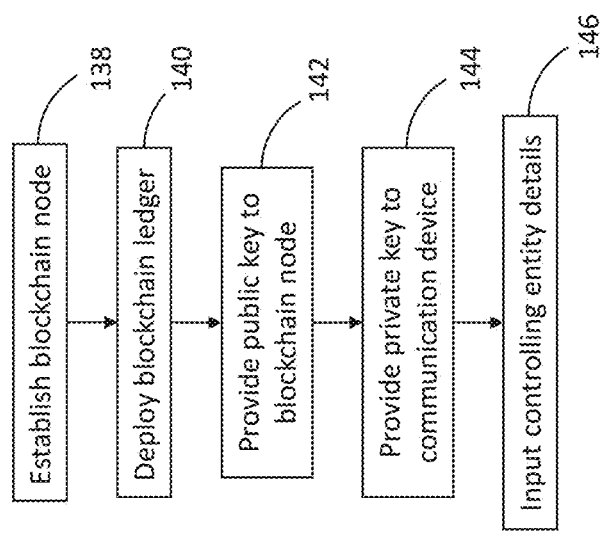
FIG. 3 is a flowchart showing a method of recording a change of authorisation state of one or more authentication agents, according to the invention.

The functionality of the embodiment of FIG. 1 will now be described in more detail, with reference to FIG. 3. Initially, a blockchain node is established 138. This involves installing and commissioning the required hardware and software. As described above, this may be in the form of a physical or virtual server, located remotely or at premises controlled or accessible to an associated controlling entity.

A blockchain ledger is deployed 140 on the blockchain node. If the new blockchain node is the first in a new blockchain network, then the blockchain ledger may initially be empty, because there have been no changes to an authorisation state of an authorisation agent. However, it will be appreciated by those skilled in the art that the blockchain ledger may, even when empty, comprise initial data, such as information that identifies the blockchain ledger, or information relating to anticipated data, such as headers or data structure information. The blockchain ledger may be pre-populated with other information, such as controlling entity data.

If the new blockchain node is being added to an existing network of one or more blockchain nodes, then a copy of the current blockchain ledger is installed on the new blockchain node, for example by using one of the methods described above.

A public key of a public key/private key pair is provided 142 to the new blockchain node, and the corresponding private key is provided 144 to a communication device. As explained above, the public key/private key pair may be generated in any suitable manner, several of which are known to those skilled in the art.

Any suitable method may be used to provide the private key to the new blockchain node and the private key to the communication device. For example, the private key may be electronically transmitted to the communication device in a secure manner. The private key may be used as an input to software installed on the device, either directly (ie, the private key is stored in a memory of the communication device) or indirectly (the private key is stored remotely from the communication device and accessed when required).

Similarly, the public key may be electronically transmitted to the blockchain node in a secure manner. The public key may be used as an input to software installed on the blockchain node, either directly (ie, the public key is stored in a memory of the blockchain node) or indirectly (the public key is stored remotely from the blockchain node and accessed when required).

The private key may be used to encrypt and digitally sign transactions and data before they are sent to the blockchain node. The public key may be used to decrypt and validate the encrypted and digitally signed transactions and data received by the new blockchain node.

Optionally, details relating to the controlling entity may be input 146, for example via the communication device. For example, the details may include any or all of:

Legal entity identifier: this is an identifier that is unique to, and permanently associated with, the legal entity.

Legal entity name: in the case of a company, this may be the company's current registered name. In the case of a natural person, this may be the person's full legal name.

Group name(s): identifies one or more parent, sibling or child companies where relevant.

Company address.

Official number(s): may include, for example, a VAT or tax office identity number for a company, or social security or national insurance number for an individual.

Authorisation agent combinations: where more than one authorisation agent is required, this field may be provided to identify the required combination(s).

Number of authorisation agents: initially zero (unless the blockchain ledger is prepopulated), this field maintains a total number of recorded authorisation agents for the current blockchain ledger.

Office location: may be per authorisation agent, to make it easier to locate each authorisation agent if required.

The legal entity information may be input to the communication device by way of a web page that displays the required fields. Additional information, such as time and/or date and/or sequence/indexing information may also be added manually or automatically. The legal entity information and any additional information are then encrypted and digitally signed using the private key. A new block comprising the encrypted information and the associated digital signature is added to the blockchain ledger to form a new blockchain ledger. The new blockchain ledger is distributed to the other blockchain nodes, for example in one of the ways described above.

The user has access to the blockchain ledger by way of the communication device. Software running on the communication device and/or any remote computer that hosts the blockchain ledger may allow the user to interrogate the blockchain ledger. By way of non-limiting examples, the user may wish to know:

All currently authorised authorisation agents.

All authorisation agents that have ever been authorized.

All agents that were authorised during all or part of some particular date range.

Whether a particular authorisation agent was authorised on a particular date (or ever).

The authorisation level of a particular authorisation agent on a particular date (or ever).

Whether a particular combination of authorisation agents was an authorised combination on a particular date (or ever).

All dates on which a particular authorisation agent or agents was or were authorised.

This list not intended to be exhaustive.

The blockchain ledger may be interrogated upon request by decrypting each block (or part thereof, if encryption was performed at a sub-block level). If there is unencrypted information for each block that allows an interrogating function to determine an associated controlling entity, then only those blocks related to that controlling entity will be decrypted. By parsing all of those blocks, for example from earliest to latest, the interrogating function may determine the information requested by the user via the communication device.

The communication device may be used to add one or more new authorisation agents in a secure and verifiable manner. To add a new authorisation agent, a user of the communication device may input the required authorisation agent information (eg, as listed above) by way of a web page that displays the required fields. Additional information, such as the time and/or date and/or sequence/indexing information, may also be added manually or automatically. The authorisation agent information and any additional information are then encrypted and digitally signed using the private key. A new block comprising the encrypted information and the associated digital signature is added to the blockchain ledger to form a new blockchain ledger. The new blockchain ledger is distributed to the other blockchain nodes in one of the ways described above.

The communication device may be used to remove one or more existing authorisation agents in a secure and verifiable manner. To remove an authorisation agent, a user of the communication device may, for example, access a current list of authorisation agents by way of a web page. The web page may include, for example, text fields, radio buttons, selection boxes and/or drop-down boxes that allow the user to change an authorisation state of one or more selected authorisation agents. For example, there may be a drop-down box beside each authorisation agent enabling the user to select from "authorised" and "not authorised", and a data selection box that enables the user to indicate the date upon which the change becomes effective. Once the authorisation state is amended to show that the required one or more authorisation agents is no longer authorised, that change of state and any additional information (such as a current time and/or date and/or sequence/indexing information) are encrypted and digitally signed using the private key. A new block comprising the encrypted information and the associated digital signature is added to the blockchain ledger to form a new blockchain ledger. The new blockchain ledger is distributed to the other blockchain nodes in one of the ways described above.

The communication device may be used to amend an authorisation state of one or more existing authorisation agents in a secure and verifiable manner. To amend an authorisation state of an authorisation agent, a user of the communication device may, for example, access a current list of authorisation agents by way of a web page. The web page may include, for example, text fields, radio buttons, selection boxes and/or drop-down boxes that allow the user to change an authorisation state of one or more selected authorisation agents. For example, there may be a drop-down box beside each authorisation agent enabling the user to select from "authorised" and "not authorised", and a data selection box that enables the user to indicate the date upon which the change becomes effective. More complex options involving different levels of authorisation (as described above, for example) may also be provided. Once the authorisation state is amended for the selected authorisation agent(s), that change of state and any additional information (such as a current time and/or date and/or sequence/indexing information) are encrypted and digitally signed using the private key. A new block comprising the encrypted information and the associated digital signature is added to the blockchain ledger to form a new blockchain ledger. The new blockchain ledger is distributed to the other blockchain nodes in one of the ways described above.

The communication device may be used to amend details of the or each authorisation agent in a secure and verifiable manner. To amend details of one or more authorisation agents, a user of the communication device may, for example, access a current list of authorisation agents by way of a web page. The web page may include, for example, text fields, radio buttons, selection boxes and/or drop-down boxes that allow the user to change an authorisation state of one or more selected authorisation agents. For example, an address of an authorised agent may be amended by editing text in an address field. In addition to amending details for an authorisation agent, a data selection box be provided to enable the user to indicate the date upon which the amendment(s) become effective. Once the details are amended for the selected authorisation agent(s), that change and any additional information (such as a current time and/or date and/or sequence/indexing information) are encrypted and digitally signed using the private key. A new block comprising the encrypted information and the associated digital signature is added to the blockchain ledger to form a new blockchain ledger. The new blockchain ledger is distributed to the other blockchain nodes in one of the ways described above.

In an embodiment, one or more third parties may be given access to the blockchain ledger so that they may determine or verify authorisation state information such as that listed above. To do this, the third party makes a request to connect and view authorisation state information. The request may be for a specific subset of the available information, such as an item from the above list. The request may be made, for example, via a web page provided by a web server that connects to the relevant blockchain node. The third party may need to establish an account before making the request. The request and any additional information (such as a current time and/or date) are encrypted and digitally signed using a private key that has been issued to the third party, then sent to the relevant blockchain node. A new block comprising the encrypted information and the associated digital signature is added to the blockchain ledger at the blockchain node to form a new blockchain ledger. The new blockchain ledger is distributed to the other blockchain nodes in one of the ways described above.

The new block is added to the blockchain ledger by, for example, software running on the computer that hosts the relevant blockchain node. The request may be forwarded to the associated communication device in response to the request being added to the blockchain ledger by way of the new block. The communication device may monitor a blockchain event log maintained on the relevant blockchain node in order to identify when a request has been submitted by a third party.

The request may be flagged to the user by way of a message, pop-up, email, sound, or other indicator. The user of the communication device is presented with the request and may then approve or reject it. The decision to approve or reject may be based on information that was input by the third party and presented to the user via the communication device. The user and/or others associated with the controlling entity may optionally undertake further enquiries before confirming the request.

The communication device may be used to confirm the request in a secure and verifiable manner. A user of the communication device may confirm the request by way of a web page, for example. The web page may include, for example, text fields, radio buttons, selection boxes and/or drop-down boxes that allow the user to confirm the request. For example, there may be a drop-down box enabling the user to select from "request confirmed" and "request denied", and a data selection box that enables the user to indicate the date upon which the request is to become effective. More complex options, such as allowing the user to request further information from the third party to enable the request to be considered for example, may also be provided.

Once the request is confirmed, the confirmation and any additional information (such as a current time and/or date and/or sequence/indexing information) are encrypted and digitally signed using the private key, and then transmitted to the relevant blockchain node. The blockchain node adds a new block comprising the encrypted information and the associated digital signature to the blockchain ledger to form a new blockchain ledger. The new blockchain ledger is distributed to the other blockchain nodes in one of the ways described above.

Different levels of encryption may be maintained for different types of data in the blockchain ledger. For example, information such as the name and address of each controlling entity may be stored in plain text, allowing a third party to access it without requiring access to a decryption key (access to unencrypted information may still be controlled by way of a user account). Other authorisation agent information may only be accessible once a request for access is authorised via the communication device, as described above.

In an embodiment, each blockchain ledger maintains an authorised agent authorisation state history for several instruments, contracts and/or controlling entities. Since several independent blockchain nodes maintain a copy of the latest version of the blockchain ledger (which in turn includes all of its previous states), one controlling entity cannot unilaterally change previous states of the blockchain ledger without the other blockchain nodes becoming aware of the change. This ensures independent validity of the blockchain ledger while allowing each controlling entity to control its own blockchain node and the changes to its own authorised agent data.

Figure 4:
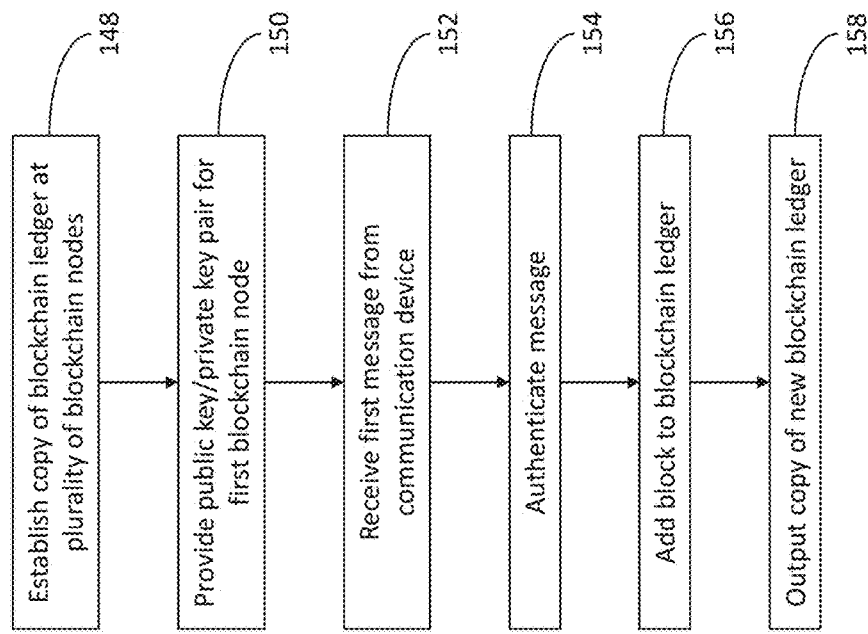
FIG. 4 is a flowchart showing a method of recording a change of authorisation state of one or more authentication agents from the perspective of a blockchain node, according to the invention.

Turning to FIG. 4, there is shown a method of recording a change of authorisation state of one or more authorisation agents, from the perspective of a blockchain node. A copy of a blockchain ledger is established 148 at each of a plurality of blockchain nodes, wherein each of the blockchain nodes is associated with a different controlling entity.

A public key/private key pair is provided 150 for a first of the blockchain nodes. The private key is stored in a communication device associated with the first controlling entity.

The blockchain node receives 152 a first message from the communication device. The first message includes first data indicative of a change of authorisation state of a first authorisation agent associated with the first controlling entity. The first data is encrypted. The first message also includes a digital signature based on the blockchain ledger and the private key.

The blockchain node authenticates 154 the message using the public key and then adds 156 a block to the blockchain ledger based on the first message. In this way, a new blockchain ledger is generated that records the change of authorisation state of the first authorisation agent.

A copy of the new blockchain ledger is output 158 for distribution to the other blockchain node(s) of the plurality of blockchain nodes.

Figure 5:
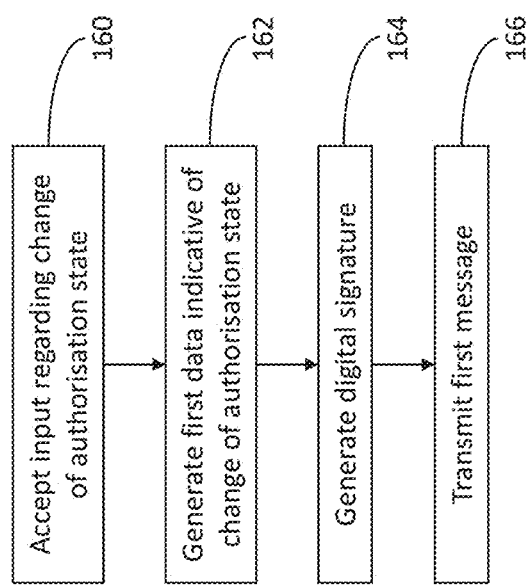
FIG. 5 is a flowchart showing a method of enabling recording of a change of authorisation state of one or more authentication agents from the perspective of a communication device, according to the invention.

Turning to FIG. 5, there is shown a method of enabling recording of a change of authorisation state of one or more authorisation agents associated with a controlling entity, from the perspective of a communication device.

The communication device accepts 160 input regarding a change of authorisation state of a first authorisation agent associated with a controlling entity and then generates 162 first data indicative of the change of authorisation state. The first data is encrypted.

A digital signature is generated 164 based on a blockchain ledger and a private key. The blockchain ledger is hosted on a plurality of blockchain nodes, at least one of which is associated with the controlling entity and accessible to the communication device.

A first message is transmitted 166 to the accessible blockchain node. The first message includes the first data and the digital signature.

The accessible blockchain node can add a block to the blockchain ledger based on the first message. A new blockchain ledger can be generated in the accessible blockchain node such that it records the change of authorisation state of the first authorisation agent.

In an embodiment, the only way to access the blockchain ledger is via the communication device and any user interface provided to third parties. Since all changes to information in the blockchain ledger are digitally signed and form part of a new block, other forms of access to the blockchain ledger may not be required or permissible.

While the described embodiments show all information as being stored in the blockchain ledger, in other embodiments, some information may be stored outside the blockchain ledger, such as in an associated database. Typically, this will be information other than the authorisation state information. It may be more acceptable to maintain information outside of the blockchain ledger if it is already publicly available. For example, an address of a public company, and any change in that address over time, is available via public records. There is therefore less reason to ensure it forms part of the blockchain ledger's verifiable transaction trail.

Each block may contain, for example, a single change relating to a single authorisation state of an authorisation agent, several changes of authorisation state of an authorisation agent, or changes of authorisation state of more than one authorisation agent.

The authorisation agent may be, for example, a human, a system or a function of a computer program that is authorised to apply a legally-binding signature or authorisation to a legal document such as a contract.

While the communication device is described in the embodiments above as being a personal computer, it may take the form of any electronic device that is capable of allowing a user to input a change of authorisation state for an authorisation agent. For example, the communication device may take the form of a mobile telephone, laptop computer, tablet computer or personal digital assistant. A blockchain node may similarly take the form of a mobile telephone, laptop computer, tablet computer or personal digital assistant.

While various functionality has been described with reference to specific electronic devices, it will be appreciated that such functionality may be distributed across several devices, or made available to the device described as having that functionality. For example, where the communication device is said to digitally sign a piece of information, it will be understood that the communication device may not directly perform the digital signing itself. The communication device may instead instruct another device, such as a remote computer, to digitally sign the information on its behalf.

Although the embodiments above describe the use of a new blockchain node for each new controlling entity, a common blockchain node may be employed for more than one controlling entity. In that case, the common blockchain node holds public keys corresponding to the respective private keys of the controlling entities that share the common blockchain node.

Where encryption, digital signing and the application of hash functions are described, the skilled person will appreciate that such functions may be applied to concatenated information, to individual pieces of information, or some combination thereof. One or more salts and/or nonce may optionally be employed prior to encryption, digital signing and/or the application of a hash function.

Generally, any of the methods or techniques described above can be implemented in modules using software, firmware, hardware (e.g. fixed logic circuitry), or any combination of these implementations. In the case of a software implementation, the module, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

The term 'processor' and 'computer' are used herein to refer to any device, or portion thereof, with processing capability such that it can execute instructions, or a dedicated circuit capable of carrying out all or a portion of the functionality or methods, or any combination thereof.

The invention has been described with reference to a number of specific non-exhaustive and non-limiting embodiments. The skilled person will appreciate that the invention may be embodied in many other forms.

The invention claimed is:

1. A method of recording a change of authorization state of one or more authorization agents, the method comprising:
   establishing a copy of a blockchain ledger at each of a plurality of blockchain nodes, wherein each of the blockchain nodes is associated with a different controlling entity;
   providing a public key/private key pair for a first of the blockchain nodes, the private key being for storage in, or in a manner accessible to, a communication device associated with a first controlling entity;
   receiving, from the communication device, a first message comprising:
      first data indicative of a change of authorization state of a first authorization agent associated with the first controlling entity, the first data being encrypted; and
      a digital signature based on the blockchain ledger and the private key;
   authenticating the first message using the public key;
   adding a block to the blockchain ledger based on the first message to generate a new blockchain ledger that records the change of authorization state of the first authorization agent; and
   outputting a copy of the new blockchain ledger for distribution to another blockchain node of the plurality of blockchain nodes.

2. The method of claim 1, wherein the digital signature comprises an output of a hash function applied to the blockchain ledger using the private key.

3. The method of claim 1, wherein the digital signature comprises an output of a hash function applied to a combination of the first data and the blockchain ledger using the private key.

4. The method of claim 1, wherein the first data is encrypted using the private key.

5. The method of claim 1, wherein the first message comprises time or indexing data.

6. The method of claim 5, wherein the digital signature comprises an output of a hash function applied to the time or indexing data using the private key.

7. A method of enabling recording of a change of authorization state of an authorization agent associated with a controlling entity, the method comprising, in a communication device:
   accepting input regarding a change of authorization state of a first authorization agent associated with a controlling entity;
   generating first data indicative of the change of authorization state, the first data being encrypted;
   generating a digital signature based on a blockchain ledger and a private key, the blockchain ledger being hosted on a plurality of blockchain nodes, at least one of which is associated with the controlling entity and accessible to the communication device; and
   transmitting a first message to the accessible blockchain node, the first message comprising the first data and the digital signature, the first message instructing the accessible blockchain node to add a block to the blockchain ledger based on the first message to generate a new blockchain ledger that records the change of authorization state of the first authorization agent.

8. The method of claim 7, wherein the digital signature comprises an output of a hash function applied to the blockchain ledger using the private key.

9. The method of claim 7, wherein the digital signature comprises an output of a hash function applied to a combination of the first data and the blockchain ledger using the private key.

10. The method of claim 7, wherein the first data is encrypted using the private key.

11. The method of claim 7, wherein the first message comprises time or indexing data.

12. The method of claim 11, wherein the digital signature comprises an output of a hash function applied to the time or indexing data using the private key.

13. A first blockchain node, the first blockchain node being one of a plurality of blockchain nodes, each blockchain node storing a copy of a block chain ledger and each blockchain node being associated with a different controlling entity and a public key/private key pair, the first blockchain node comprising:
   a non-transitory computer-readable storage medium having instructions recorded thereon, which, when executed, configure the first blockchain node to record a change of authorization state of one or more authorization agents by:
      receiving, from a communication device storing a private key or capable of accessing the private key, a first message comprising:
         first data indicative of a change of authorization state of a first authorization agent associated with a first controlling entity, the first data being encrypted; and
         a digital signature based on the blockchain ledger and the private key;
      authenticating the first message using the public key;
      adding a block to the blockchain ledger based on the first message to generate a new blockchain ledger that records the change of authorization state of the first authorization agent; and
      outputting a copy of the new blockchain ledger for distribution to another blockchain node of the plurality of blockchain nodes.

14. The first blockchain node of claim 13, wherein the digital signature comprises an output of a hash function applied to the blockchain ledger using the private key.

15. The first blockchain node of claim 13, wherein the digital signature comprises an output of a hash function applied to a combination of the first data and the blockchain ledger using the private key.

16. The first blockchain node of claim 13, wherein the first data is encrypted using the private key.

17. The first blockchain node of claim 13, wherein the first message comprises time or indexing data.

18. The first blockchain node of claim 17, wherein the digital signature comprises an output of a hash function applied to the time or indexing data using the private key.

19. A communication device for enabling recording of a change of an authorization agent associated with a controlling entity, the communication device comprising:
   a non-transitory computer-readable storage medium having instructions recorded thereon, which, when executed, cause the communication device to:
      accept input regarding a change of authorization state of a first authorization agent associated with a controlling entity;
      generate first data indicative of the change of authorization state, the first data being encrypted;
      generate a digital signature based on a blockchain ledger and a private key, the blockchain ledger being hosted on a plurality of blockchain nodes, at least one of which is associated with the controlling entity and accessible to the communication device; and
      transmit a first message to the accessible blockchain node, the first message comprising the first data and the digital signature, the first message instructing the accessible blockchain node to add a block to the blockchain ledger based on the first message to generate a new blockchain ledger that records the change of authorization state of the first authorization agent.

20. The communication device of claim 19, wherein the digital signature comprises an output of a hash function applied to the blockchain ledger using the private key.

21. The communication device of claim 19, wherein the digital signature comprises an output of a hash function applied to a combination of the first data and the blockchain ledger using the private key.

22. The communication device of claim 19, wherein the first data is encrypted using the private key.

23. The communication device of claim 19, wherein the first message comprises time or indexing data.

24. The communication device of claim 23, wherein the digital signature comprises an output of a hash function applied to the time or indexing data using the private key.

* * * * *